(12) United States Patent
Schetter et al.

(10) Patent No.: US 6,296,100 B1
(45) Date of Patent: Oct. 2, 2001

(54) COUPLING TOOTH OF A SELECTOR SLEEVE OF A GEAR COUPLING FOR COUPLING A GEAR WHEEL TO ITS SHAFT

(75) Inventors: Martin Schetter, Besigheim; Ralf Sperber, Wendlingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/485,301

(22) PCT Filed: Jul. 25, 1998

(86) PCT No.: PCT/EP98/04671

§ 371 Date: May 9, 2000

§ 102(e) Date: May 9, 2000

(87) PCT Pub. No.: WO99/08014

PCT Pub. Date: Feb. 18, 1999

(30) Foreign Application Priority Data

Aug. 8, 1997 (DE) .............................. 197 34 492

(51) Int. Cl.⁷ .................................................. F16D 23/06
(52) U.S. Cl. ...................... 192/108; 192/53.34; 192/69.9; 192/114 T
(58) Field of Search ................................ 192/53.34, 53.4, 192/69.9, 108, 114 T

(56) References Cited

U.S. PATENT DOCUMENTS

| | | | |
|---|---|---|---|
| 3,367,462 | * 2/1968 | Bibbens | 192/108 X |
| 4,181,210 | * 1/1980 | Bibbens | 192/114 T |
| 4,189,041 | * 2/1980 | Muller | 192/53.34 |
| 4,727,968 | * 3/1988 | Chana | 192/53.34 |
| 4,848,548 | * 7/1989 | Diehl | 192/69.9 |
| 4,905,806 | * 3/1990 | Hillenbrand et al. | 192/108 X |
| 5,547,057 | 8/1996 | Sperber . | |
| 5,960,925 | * 10/1999 | Helms et al. | 192/108 |

FOREIGN PATENT DOCUMENTS 44 13 169 C1  5/1995 (DE) .
0 500 408 A1  8/1992 (EP) .
58-214022 * 12/1983 (JP) ..................... 192/108

* cited by examiner

Primary Examiner—Rodney H. Bonck
(74) Attorney, Agent, or Firm—Crowell & Moring, LLP

(57) ABSTRACT

To guide it in the circumferential directions, a clutch tooth of a selector sleeve of a gear wheel clutch for coupling a gear wheel to its shaft has two central guide faces and additional guide faces on its ends.

3 Claims, 4 Drawing Sheets

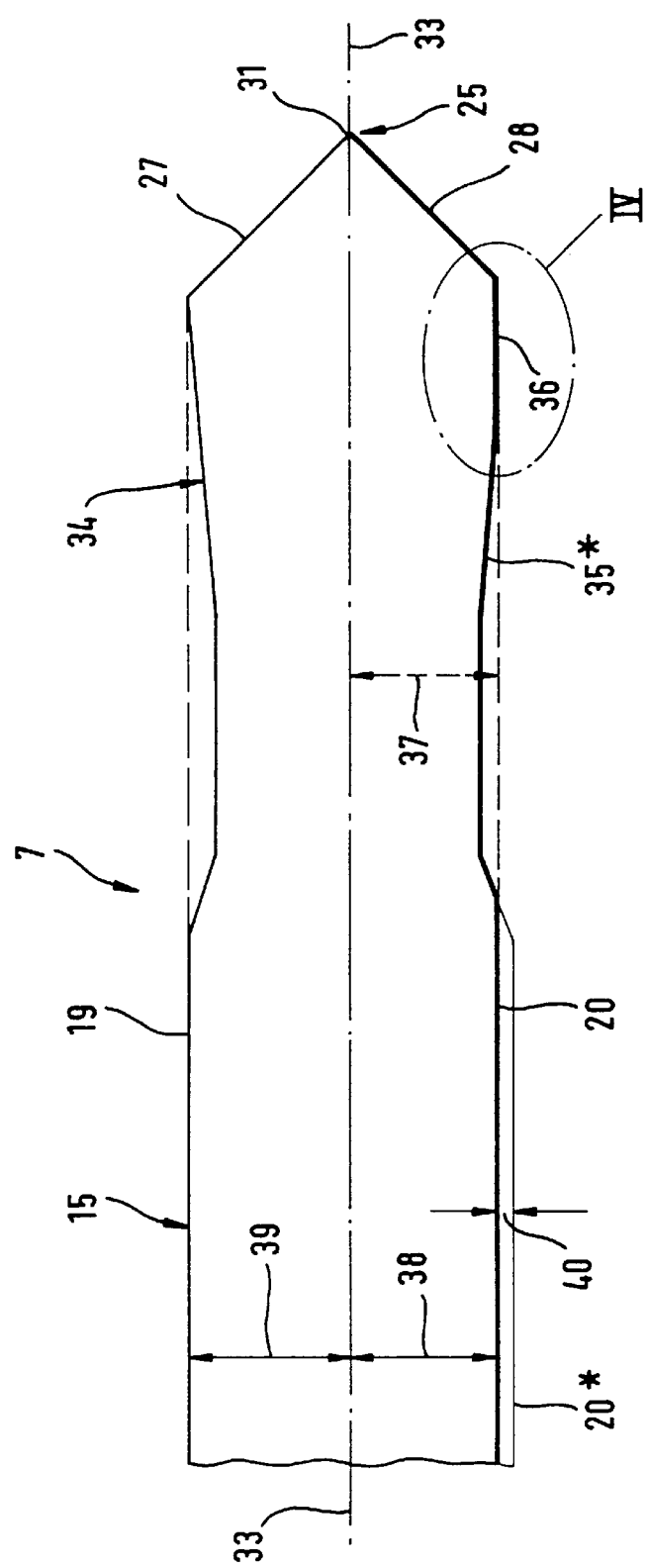
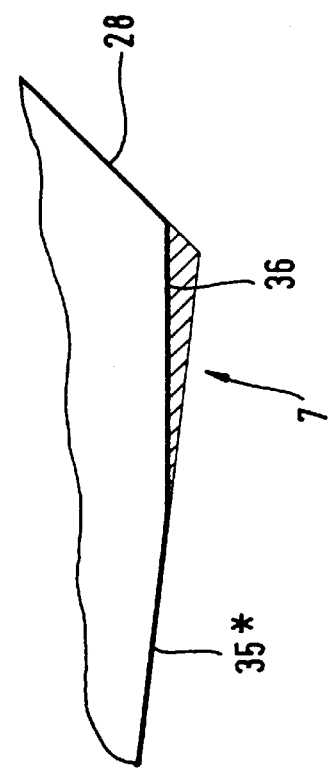
Fig. 3
Fig. 4

COUPLING TOOTH OF A SELECTOR SLEEVE OF A GEAR COUPLING FOR COUPLING A GEAR WHEEL TO ITS SHAFT

BACKGROUND AND SUMMARY OF THE INVENTION

The present invention relates to a particularly configured clutch tooth of a selector sleeve.

According to European publication EP 0 288 718 B1, all the clutch teeth of a selector sleeve of a gear wheel clutch for coupling a gear wheel to its shaft can be configured either in accordance with the generic type or symmetrically to the significant longitudinal center plane of the tooth in such a way that the respective reduced tooth flank portion is in the form of a recess in the side flank of the tooth. A corresponding undercut tooth flank portion of a clutch tooth of the gear wheel engages into this recess with radial overlap in the engaged state in order to prevent the selector sleeve from jumping back into its neutral position.

In known selector sleeve clutch teeth of the generic type in European publication EP 0 276 382 B1 and German Patent 845,903, the respectively reduced tooth flank portions are in the form of recesses in the side flanks of the tooth. In the case of the European publication, these recesses interact with undercut tooth flank portions and, in the case of the German patent, they interact with recesses in the side flanks of the clutch teeth of the gear wheel to prevent the selector sleeve from jumping out of the clutch toothing of the gear wheel. In these known clutch teeth with reduced tooth flank portions in the form of recesses in the side flanks of the tooth, the oblique end faces at the ends do admittedly merge into the respective recess by way of additional guide faces extending parallel to the significant longitudinal plane of the tooth, thus advantageously increasing the guiding length of the selector sleeve. In these known selector-sleeve clutch teeth, however, there is an unwanted increase in the engagement travel of the gear wheel clutch because the tooth portion extending axially between the recess and the end of the tooth requires an idle travel as spacing with respect to the gear wheel.

European publication EP 0 195 706 B1 discloses a selector sleeve of a gear wheel clutch for coupling a gear wheel to its shaft with non-generic clutch teeth without undercut tooth flank portions. In the clutch, the two mutually opposite flanks of each pair or the majority of pairs of successive clutch teeth alternately have two central thickened portions, between which one of the driver teeth associated in a manner fixed in terms of motion to the shaft engages in a displaceable manner, or two projections provided on the ends and extending out in the circumferential direction, the projections each entering into radial overlap, when the selector sleeve is moved into its coupled position, with an undercut tooth flank portion of a clutch tooth of the gear wheel in order to prevent the selector sleeve from jumping back into its neutral position. Apart from the fact that the projections of the clutch teeth of the selector sleeve have an unfavorable effect when passing through the locking toothing of the synchronizer ring, those clutch teeth in this known selector sleeve, which do not have central thickened portions but are only provided with the end projections, cannot exercise a guiding function, and the torque transmission capacity of the selector sleeve is thus impaired.

German publication DE 44 13 169 C1 discloses a clutch tooth of a selector sleeve of a gear wheel clutch for coupling a gear wheel to its shaft. The guide portion, which is arranged centrally in relation to the directions of the center line of the selector sleeve, is bounded in both peripheral directions of the center line by a respective guide face extending parallel to the center line. The guide portion can be introduced, so as to be axially displaceable and fixed in terms of rotation, into an axial driver toothing concentric with and fixed in terms of movement relative to the shaft. Each of the ends forming a boundary in the directions of the center line has two oblique end faces, which are arranged in a roof shape relative to one another, the common vertex edge of which lies in a significant longitudinal plane of the tooth containing the center line. The side flanks each comprise one guide face of the guide portion, a tooth flank portion which adjoins it in the direction of the center line towards one end and is at a reduced distance from the significant longitudinal plane of the tooth, and the oblique end face, which, like the guide face, lies on the same side of the significant longitudinal plane of the tooth and in which one oblique end face merges directly into an undercut tooth flank portion. In the direction of the guide portion, the undercut tooth flank converges with straight flank lines relative to the significant longitudinal plane of the tooth. The other oblique end face merges, in the direction of the center line towards the guide portion, into an overall guide surface which extends parallel to the center line and forms a continuous coherent surface with the guide-portion guide face on the same side of the significant longitudinal plane of the tooth and the distance of which from the significant longitudinal plane of the tooth is less than the distance of the guide-portion guide face on the other side of the significant longitudinal plane of the tooth from the significant longitudinal plane of the tooth.

The object on which the invention is based is essentially to avoid increasing the engagement travel (gear-change travel) as described while retaining an increased guiding length.

In the clutch tooth according to the invention, a third guide face is formed on one flank side in the region of one end. This guide face significantly extends the guiding length of the clutch tooth in the coupled position of the selector sleeve, with the result that the selector sleeve no longer sticks in the driver toothing associated with the shaft.

The clutch tooth according to the invention, in the initial state, is symmetrical with undercut tooth flank portions on both tooth flank sides on both sides of a longitudinal center plane of the tooth. The clutch tooth can be produced from a conventional clutch tooth by reducing the thickness of the tooth by a constant amount parallel to the center line of the selector sleeve, on one side of the originally central longitudinal plane of the tooth, to such an extent that a relatively short, separate, third guide face is formed on the end concerned.

An advantageous feature of the invention is that, the selector sleeve can be provided both with conventional clutch teeth with symmetrical undercut tooth flank portions and with clutch teeth according to the invention, with a third guide face in the region of the ends.

An additional advantageous feature of the invention is that the clutch teeth can be divided into two groups which initially, starting from a common initial tooth thickness, are all symmetrical and have the same dimensional shape and depth of the undercut tooth flank portions.

A first group of teeth comprises conventional symmetrical teeth which act in the customary manner as regards all the functions of toothing such as meshing, locking, releasing, idle travel and gear retention.

The thickness of the teeth of a second group is reduced on one side during the manufacturing process. The driver toothing associated with the shaft is thickened at the corresponding points by the amount removed from the selector sleeve, and the backlash thus remains unaltered. During the production of such a selector sleeve, the selector sleeve is initially symmetrical, i.e. has been broached with a group of initial teeth and rolled to give a uniform shape to the undercut tooth flank portions. In the subsequent operation, namely calibration broaching, both the small calibration amount and also, in addition, the tooth thickness are removed from the guide faces with a correspondingly designed broach to give the third guide face. This method is advantageous because, in contrast to conventional toothing, neither additional operations nor rolling of undercut tooth flank portions of different depths is required.

In gear wheel clutches for coupling a gear wheel to its shaft, it is customary to use an annular selector sleeve carrier which is arranged concentrically and fixed in terms of motion relative to the shaft, and which carries the driver toothing for the selector sleeve. Applying the invention to a gear wheel clutch of this kind, the selector sleeve and the driver toothing in this clutch can be configured in order to give symmetrical tooth gaps on the selector sleeve with in each case two asymmetrical clutch teeth lying symmetrically to the thickened driver tooth of the selector sleeve carrier. The advantage of a gear wheel clutch configured in this way lies in the simple configuration of the selector sleeve carrier obtained from external suppliers, which can thus be fitted as it arrives.

The invention is described in greater detail below with reference to an embodiment illustrated schematically in the drawing figures.

BRIEF DESCRIPTION OF THE DRAWINGS

FIG. 3 shows a longitudinal section through one of the clutch teeth, according to the invention, of the selector sleeve in FIG. 1, FIG. 4 shows the detail IV of the clutch tooth in FIG. 3 on an enlarged scale, in FIG. 5, only the engagement with radial overlap of the undercut tooth flank portions of one of the conventional clutch teeth of the selector sleeve and of a clutch tooth of the gear wheel to be coupled are shown.

DESCRIPTION OF THE PREFERRED EMBODIMENTS

Figure 1:
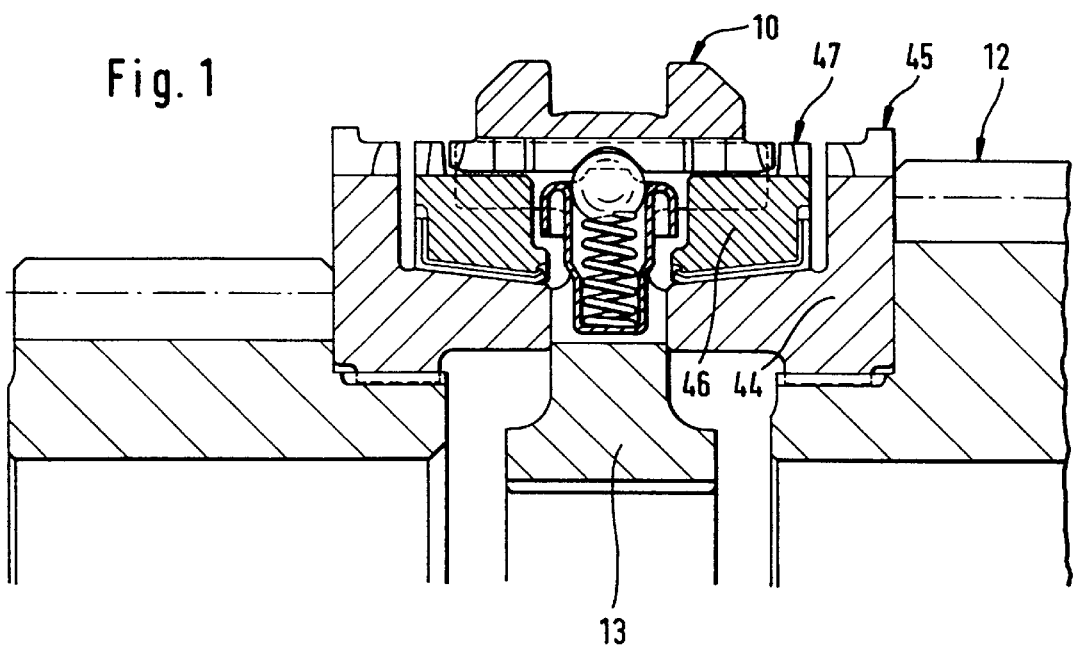
FIG. 1 shows an axial section through a gear wheel clutch for coupling a gear wheel to its shaft, with a selector sleeve having clutch teeth in accordance with the invention.
Figure 1:
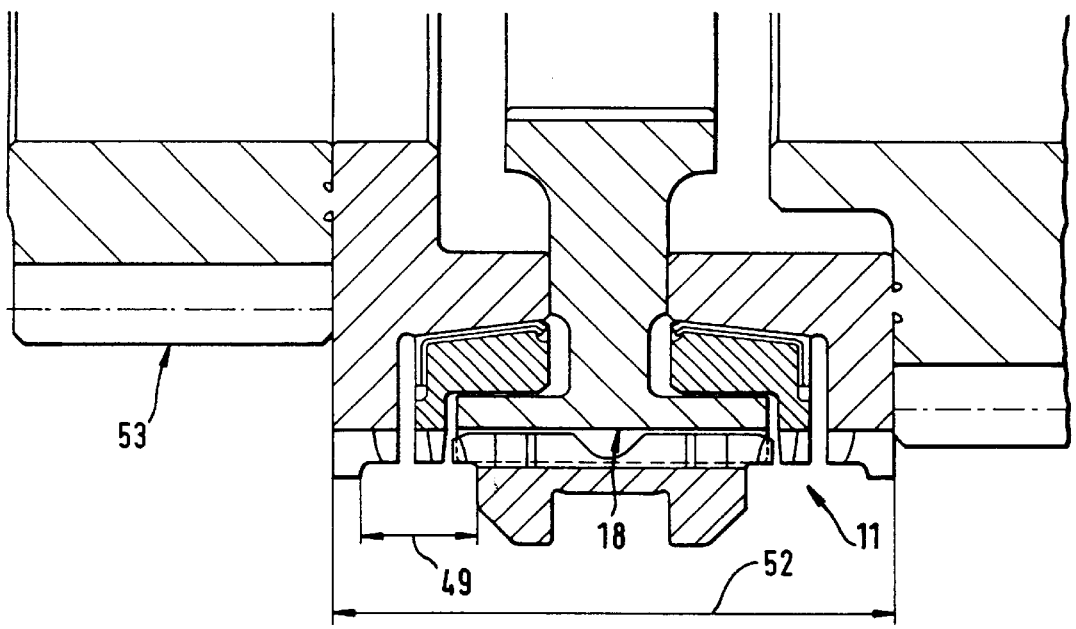

Arranged concentrically and in a manner fixed in terms of motion on a shaft which is coaxial to a center line 14—14 of a gear wheel clutch 11 but is not shown specifically is an annular selector sleeve carrier 13. On its outer circumference, the carrier has outer axial driver toothing 18 into which a likewise annular selector sleeve 10 arranged concentrically with the center line 14—14 engages in an axially displaceable and rotationally fixed manner by way of corresponding inner clutch toothing 7, 8.

Mounted rotatably and in an axially non-displaceable manner on the shaft, laterally adjacent to the selector sleeve carrier 13, is a gear wheel 12 which, on its end facing the selector sleeve carrier 13, has a clutch ring 44 which is concentric with the center line 14—14, is arranged so as to be fixed in terms of motion relative to the gear wheel 12, and has outer clutch toothing 45 into which the selector sleeve 10 can be moved axially by means of its corresponding inner clutch toothing 7, 8.

Arranged in the axial interspace between the gear wheel 12 and the selector sleeve carrier 13 is a synchronizer ring 46, which is concentric with the center line 14—14, is fixed with the ability for limited rotation relative to the selector sleeve carrier 13, and has outer locking toothing 47 which is concentric with the center line 14—14 and is traversed in the customary manner by the clutch toothing 7, 8 of the selector sleeve 10 once the gear wheel and the shaft have been synchronized.

Figure 2:
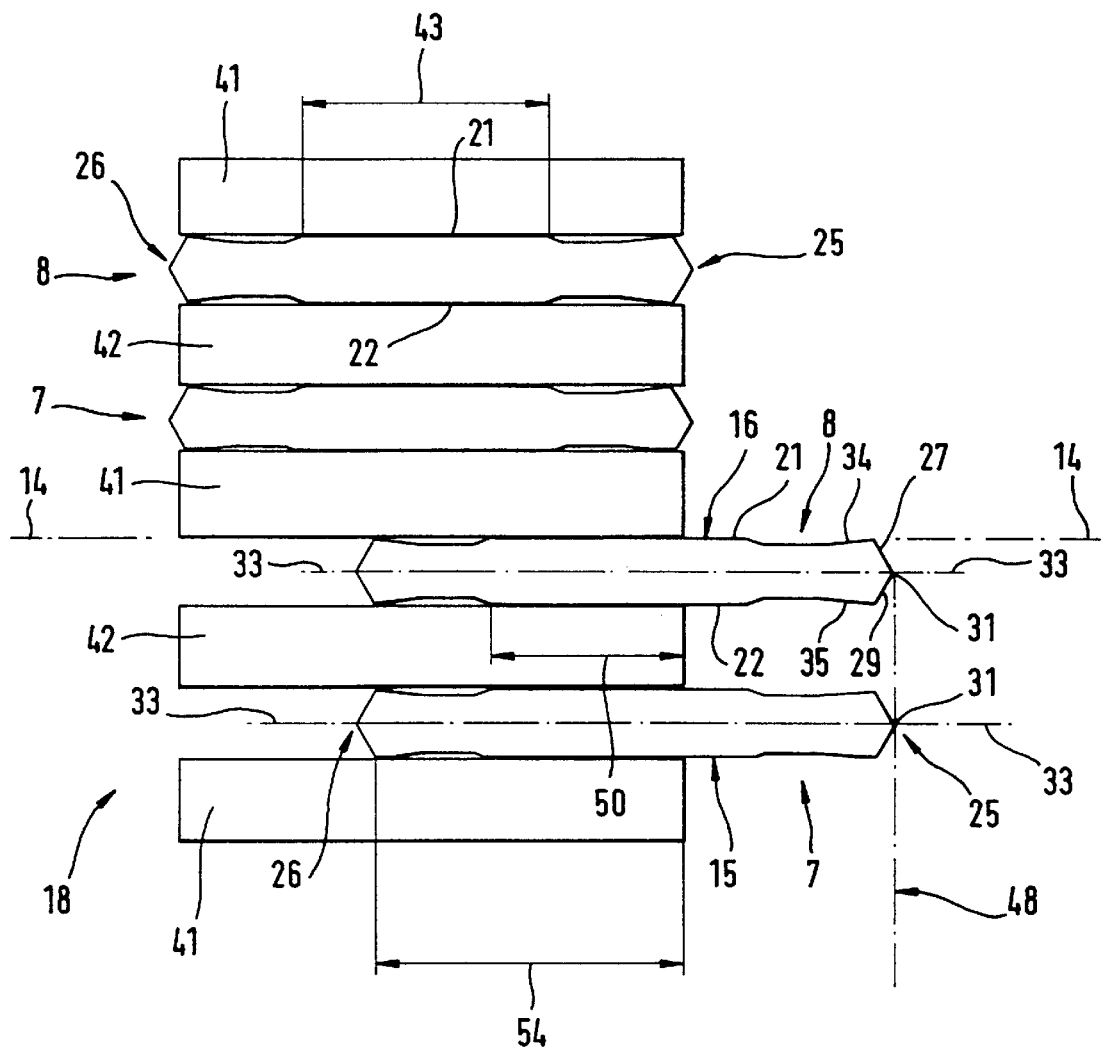
FIG. 2 shows a longitudinal section in the form of a development through the toothing of the selector sleeve and the selector sleeve carrier of the gear wheel clutch of FIG. 1.
Figure 5:
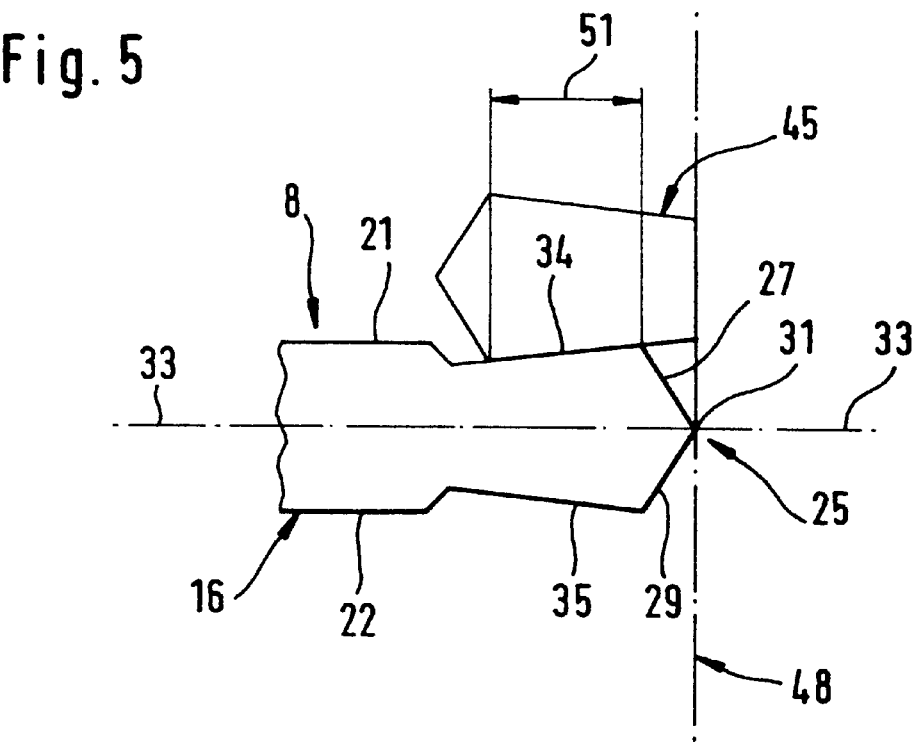
FIG. 5 shows a longitudinal section in the form of a development through the gear wheel clutch in FIG. 1 in the coupled state of the selector sleeve and on an enlarged scale.

In the illustrative embodiment in FIG. 2, the selector sleeve 10 has clutch teeth 7 in accordance with the invention and conventional clutch teeth 8, arranged alternately in the circumferential direction. Each of the clutch teeth 8 has a central guide portion 16 with two guide faces 21 and 22 of guiding length 43, which are symmetrical with respect to a significant tooth longitudinal plane 33—33 containing the center line 14—14. In the engaged position 48 of the selector sleeve 10, this guiding length 43 is reduced to the shorter overlap length 50 relative to the driver toothing 18, owing to the gear-change path 49 travelled. At their ends 25 and 26, the clutch teeth 8 have oblique end faces 27 and 29 which slope relative to the longitudinal plane 33—33 of the teeth and are symmetrical to the longitudinal plane 33—33 of the teeth, with the result that their common vertex edge 31 lies in the longitudinal plane 33—33 of the teeth. An undercut tooth-flank portion 34, 35 starts from each of the two oblique end faces 27 and 29, in each case in the direction of the center line 14—14 towards the guide portion 16, these tooth-flank portions converging with straight flank lines in the direction of the guide portion 16.

By virtue of a corresponding configuration of the clutch tooth 45 on the clutch ring 44 of the gear wheel 12, there is an axial engagement overlap 51 between the clutch teeth 8 and 45 in the engaged position 48 of the selector sleeve 10. The purpose of this overlap is to secure the selector sleeve 10 against jumping out in the engaged state by way of an undercut subjected to torque. Depending on the gear position and construction of the gearbox, a certain minimum overlapped length is necessary here. This engagement overlap 51, which is "conical" by virtue of the convergence of the undercut flank portions 34, 35, is advantageously short in the directions of the center line 14—14, thus allowing the overall length 52 of the gear wheel clutch 11, generally designed as a changing clutch for the gear wheel 12 and a second gear wheel 53, to be kept short. However, it is not possible reliably to prevent sticking of the selector sleeve 10 in the driver toothing 18 due to the shortening of the guiding length 43 to the overlapping length 50.

This sticking is avoided by the invention by virtue of the fact that on each of the clutch teeth 7, which are identical in their configuration with the clutch teeth 8 in the initial state, one flank side 20* is set back by a constant amount 40 parallel to the significant longitudinal plane 33—33 of the teeth. This gives rise, at the transition between one oblique end face 28 and the undercut tooth flank portion 35* in the region of one end 25 of the clutch tooth 7, to an additional third guide face 36 with a flank line which is parallel to the center line 14—14 and is at a distance 37 from the significant longitudinal plane 33—33 of the teeth which is equal to the distance 38 of the guide face 20 set back in this way on the central guide portion 15 of the clutch tooth 7. An associated adjacent driver tooth 41 on the selector sleeve carrier 13 is widened in a corresponding manner, and there is thus no change in the backlash.

The amount 40 can be chosen so that there is no longer an undercut residual tooth flank portion (35*) Instead, an enlarged overall guide face extending continuously from the guide portion 15 to the oblique end face 28 is formed. That flank side of the clutch tooth 7 which lies on the other side of the longitudinal plane 33—33 of the tooth is naturally of conventional design; in the direction of the center line 14—14 towards the guide portion 15, the oblique end face 27 which has a common vertex 31 with the oblique end face 28, the vertex lying in the longitudinal plane 33—33 of the tooth, merges into an undercut tooth flank portion 35 which extends as far as the guide face 19 of the guide portion 15 and converges towards the longitudinal plane 33—33 of the tooth. The guide face 19 is at a distance 39 from the longitudinal plane 33—33 of the tooth which is greater by the amount 40 than the distance 38. In corresponding fashion, the driver tooth 42 of the selector sleeve carrier 13 which engages between the guide flank 19 and a conventional clutch tooth 8 has the normal original tooth thickness.

In some or half of the clutch teeth 7 according to the invention, the tooth flank side having the guide face 19 can be set back by a constant amount instead of the tooth flank side having the guide face 20*. Two clutch teeth 7, on one of which the guide face 19 and on the other of which the guide face 20 or 20* is set back, can be arranged on both sides of a conventional clutch tooth 8, or in front of and behind it in the circumferential direction.

All these configurations in accordance with the invention have the common advantage that the overlap length 50 of a conventional clutch tooth 8, which amounts to less than half the length of a driver tooth 41 or 42, is increased to an overlap length 54 which amounts to more than half the length of a driver tooth 41 or 42, with the result that the sticking phenomena explained no longer occur.

Figure 6:
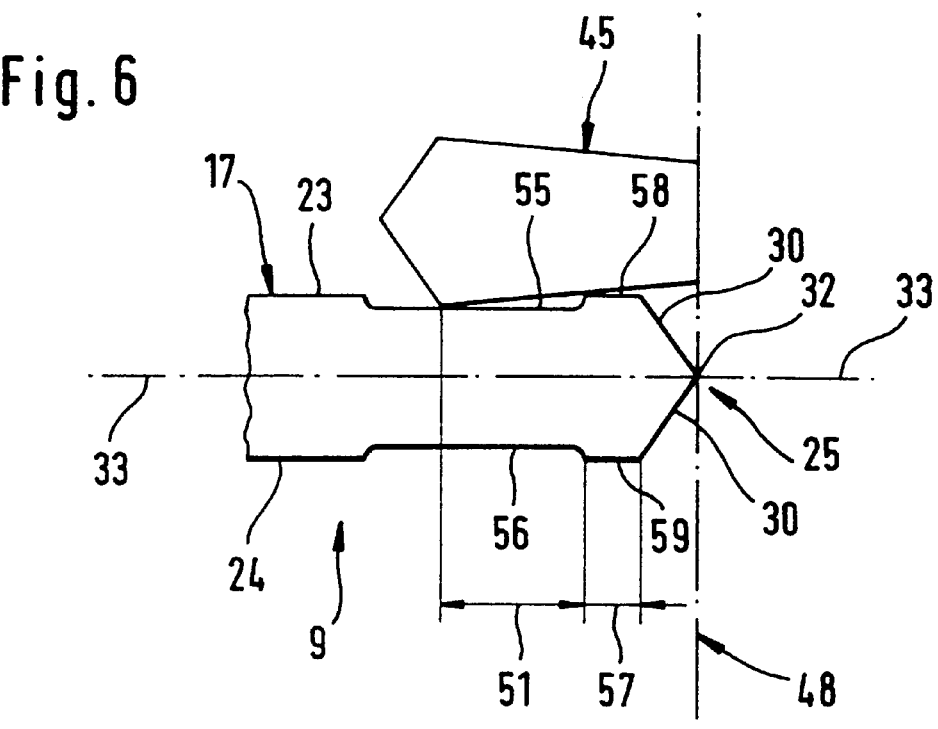
FIG. 6 shows a longitudinal section in the form of a development corresponding to the illustration in FIG. 5 through a gear wheel clutch in which the clutch teeth of the selector sleeve are configured in a manner different from the invention.

In the imaginary example of a clutch tooth 9 for a selector sleeve in accordance with FIG. 6, oblique end faces 30, 30 with a common vertex edge 31 lying in a longitudinal centre plane 33—33 of the tooth are formed on one end 25, symmetrically to the longitudinal center plane of the tooth. These oblique faces merge into respective guide faces 58 and 59 extending parallel to the center line 14—14. The central guide portion 17 of the clutch tooth 9 has the customary symmetrical guide faces 23 and 24 which, in the direction of the center line 14—14 towards the end 25, merge into respective tooth flank portions 55 and 56 which are undercut relative to the guide faces 58 and 59, respectively, on the same side and the flank lines of which likewise run parallel to the centre line 14—14. If the selector sleeve is moved into its coupled position 48 in this example and 51 represents the minimum amount of engagement overlap, then the gear-change travel required for this is greater by the length 57 of the guide faces 58 and 59.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Clutch tooth of a selector sleeve of a gear wheel clutch for coupling a gear wheel to its shaft, comprising:

a guide portion, which is arranged centrally in relation to directions of a center line of the selector sleeve, guide faces by which the clutch tooth is bounded in both peripheral directions of the center line, said guide faces extending parallel to the center line, wherein the guide portion can be introduced so as to be axially displaceable and fixed in terms of rotation into driver toothing concentric with and fixed in terms of movement relative to the shaft, and ends forming a boundary in the directions of the center line, each of said ends having two oblique end faces, which are arranged in a roof shape relative to one another and which define a common vertex edge which lies in a significant longitudinal plane of the tooth containing the center line, wherein each of the side flanks comprises one of said guide faces of the guide portion, a tooth flank portion which adjoins it in the direction of the center line towards one end and is at a reduced distance from a significant longitudinal plane of the tooth, wherein each of the oblique end faces and one of the guide faces lie on the same side of the significant longitudinal plane of the tooth, wherein one oblique end face merges directly into an undercut tooth flank portion which, in the direction of the guide portion, converges with straight flank lines relative to the significant longitudinal plane of the tooth, wherein the other oblique end face merges, in the direction of the center line towards the guide portion, into an undercut tooth flank portion which converges with straight flank lines relative to the significant longitudinal plane of the tooth in the direction of the guide portion, the other oblique end face merging into the tooth flank portion via a third guide face which extends parallel to the center line and is at the same distance from the significant longitudinal plane of the tooth as one of said guide faces of the guide portion which lies on the same side of the significant longitudinal plane of the tooth, and wherein the distance between the third guide face and the significant longitudinal plane of the tooth is less than the distance between one of said guide faces of the guide portion which lies on the other side of the significant longitudinal plane of the tooth and the significant longitudinal plane of the tooth.

2. Selector sleeve of a gear wheel clutch for coupling a gear wheel to its shaft with at least one group of first clutch teeth with guide faces formed exclusively on the guide portion and with at least one group of second clutch teeth, each clutch tooth of the second clutch teeth comprising:

a guide portion, which is arranged centrally in relation to directions of a center line of the selector sleeve, guide faces by which the clutch tooth is bounded in both peripheral directions of the center line, said guide faces extending parallel to the center line, wherein the guide portion can be introduced so as to be axially displaceable and fixed in terms of rotation into driver toothing concentric with and fixed in terms of movement relative to the shaft, and ends forming a boundary in the directions of the center line, each of said ends having two oblique end faces which are arranged in a roof shape relative to one another and which define a common vertex edge which lies in a significant longitudinal plane of the tooth containing the center line, wherein each of the side flanks comprises one of said guide faces of the guide portion, a tooth flank portion which adjoins it in the direction of the center line towards one end and is at a reduced distance from a significant longitudinal plane of the tooth, wherein each of the oblique end faces and one of the guide faces lie on the same side of the significant longitudinal plane of the tooth, wherein one oblique end face merges directly into an undercut tooth flank portion which, in the direction of the guide portion, converges with straight flank lines relative to the significant longitudinal plane of the tooth, wherein the other oblique end face merges, in the direction of the center line towards the guide portion, into an undercut tooth flank portion which converges with straight flank lines relative to the significant longitudinal plane of the tooth in the direction of the guide portion, the other oblique end face merging into the tooth flank portion via a third guide face which extends parallel to the center line and is at the same distance from the significant longitudinal plane of the tooth as one of said guide faces of the guide portion which lies on the same side of the significant longitudinal plane of the tooth, and wherein the distance between the third guide face and the significant longitudinal plane of the tooth is less than the distance between one of said guide faces of the guide portion which lies on the other side of the significant longitudinal plane of the tooth and the significant longitudinal plane of the tooth.

3. Gear wheel clutch for coupling a gear wheel to its shaft with a selector sleeve according to claim 2, wherein two of said clutch teeth in said group of second clutch teeth which are adjacent in the circumferential direction and have third guide faces acting in opposite circumferential directions are arranged on both sides of and symmetrically to a driver tooth which is fixed in terms of motion relative to the shaft and is widened in both circumferential directions by the respective difference in spacing of the third guide face of the adjoining clutch tooth.

* * * * *